United States Patent [19]

Hefner, Jr.

[11] Patent Number: 4,587,293

[45] Date of Patent: May 6, 1986

[54] REACTIVE FLEXIBILIZING MONOMER AND THERMOSETTABLE COMPOSITIONS CONTAINING SAME

[75] Inventor: Robert E. Hefner, Jr., Lake Jackson, Tex.

[73] Assignee: The Dow Chemical Company, Midland, Mich.

[21] Appl. No.: 694,553

[22] Filed: Jan. 23, 1985

Related U.S. Application Data

[60] Continuation-in-part of Ser. No. 582,663, Feb. 24, 1984, abandoned, which is a division of Ser. No. 484,040, Apr. 11, 1983, abandoned.

[51] Int. Cl.[4] .................... C08L 67/06; C08L 77/12; C08L 63/10
[52] U.S. Cl. ........................................ 525/49; 525/44; 525/421; 525/531; 525/922; 526/281; 526/283; 526/307.5; 526/320
[58] Field of Search ............... 525/44, 49, 421, 531, 525/922; 526/283, 309.5, 320, 281

[56] References Cited

U.S. PATENT DOCUMENTS

| 2,970,984 | 2/1961 | D'Alelio | 528/101 |
|---|---|---|---|
| 3,327,019 | 6/1967 | Mylenbusch | 525/44 |
| 4,115,370 | 9/1978 | Corrado | 525/421 |
| 4,233,432 | 11/1980 | Curtis | 528/303 |
| 4,237,035 | 12/1980 | Kanagawa | 528/101 |
| 4,350,789 | 9/1982 | Rowe | 525/31 |
| 4,384,129 | 5/1983 | Zahir | 528/101 |
| 4,394,497 | 7/1983 | Nelson | 528/101 |
| 4,410,686 | 10/1983 | Hefner | 528/288 |

FOREIGN PATENT DOCUMENTS

| 53-088094 | 8/1978 | Japan | 528/101 |
|---|---|---|---|
| 53-108191 | 9/1978 | Japan | 528/101 |

OTHER PUBLICATIONS

Lee H., Handbook of Epoxy Resins, McGraw-Hill, N.Y. p. 16/12-16/14, 1967.

Primary Examiner—John C. Bleutge
Assistant Examiner—Patricia A. Short
Attorney, Agent, or Firm—J. G. Carter

[57] ABSTRACT

A composition is described which thermosets when admixed with a free radical generating catalyst which composition comprises (A) an unsaturated polyester resin or vinyl ester resin, (B) a reactive monomer prepared by reacting (1) an aromatic material containing, per molecule, one polymerizable ethylenically unsaturated group and one group containing an ether linked epoxide group; and (2) a material containing at least one oxyalkylene group and is terminated in a group having at least one hydrogen atom which is reactive with an ether linked epoxide group, and (C) a polymerizable ethylenically unsaturated non-resinous monomer different from Component (B).

6 Claims, No Drawings

REACTIVE FLEXIBILIZING MONOMER AND THERMOSETTABLE COMPOSITIONS CONTAINING SAME

CROSS REFERENCE TO RELATED APPLICATION

This is a continuation-in-part of application Ser. No. 582,663 filed Feb. 24, 1984, now abandoned which is a divisional of application Ser. No. 484,040 filed April 11, 1983, now abandoned.

BACKGROUND OF THE INVENTION

The present invention pertains to ethylenically unsaturated monomers, polymers prepared therefrom and thermosettable resin compositions containing same.

Unsaturated polyester and vinyl ester resins are well known and have many useful properties. However, they are usually somewhat deficient in some properties such as elongation, ductility and impact strength. The present invention provides a reactive monomer which provides such resins with an improvement in one or more of its properties such as, for example, elongation, ductility and impact strength.

SUMMARY OF THE INVENTION

One aspect of the present invention concerns an ethylenically unsaturated monomer resulting from reacting (A) an aromatic material containing, per molecule, one polymerizable ethylenically unsaturated group and one group containing an ether linked epoxide group; and (B) a material containing at least one oxyalkylene group and is terminated in a group having at least one hydrogen atom which is reactive with an ether linked epoxide group and which hydrogen atom is not attached to an oxygen atom which is attached to an aromatic ring; and wherein the components are employed in quantities which provides an equivalent ratio of A:B of from about 0.1:1 to about 6:1, preferably from about 1:1 to about 4:1, most preferably from about 1:1 to about 3:1.

The ethylenically unsaturated monomer can be prepared by mixing the two component materials and conducting the reaction. Staged addition of all or a part of one component to the other component is also operable.

Another aspect of the present invention concerns polymers prepared by polymerizing one or more of any of the aforementioned monomers optionally in the presence of one or more non-resinous monomers containing a polymerizable ethylenically unsaturated group.

Still another aspect of the present invention concerns a composition which when admixed with a suitable quantity of a catalyst system therefor thermosets to a cured condition, which composition comprises (A) an unsaturated polyester resin or vinyl ester resin or mixture of either or both of such resins;

(B) at least one of the aforementioned polymerizable monomers and (C) a polymerizable ethylenically unsaturated non-resinous monomer different from Component (B) and wherein (i) Component (A) is present in a quantity of from about zero or 1 to about 99, preferably from about 20 to about 80, most preferably from about 40 to about 60 percent by weight of the combined weight of Components (A), (B) and (C);

(ii) Component (B) is present in quantities of from about 1 to about 95, preferably from about 1 to about 25, most preferably from about 1 to about 15 percent by weight of the combined weight of Components (A), (B) and (C); and (iii) Component (C) is present in quantities of from zero to about 99, preferably from about 15 to about 75, most preferably from about 25 to about 55 percent by weight of the combined weight of Components (A), (B) and (C).

DETAILED DESCRIPTION OF THE INVENTION

Suitable aromatic materials containing, per molecule, an ether linked epoxide group includes but is not limited to those represented by the formula

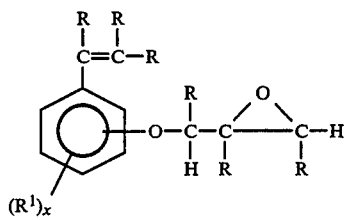

wherein each R group is independently selected from hydrogen or an alkyl group having from 1 to about 4 carbon atoms; each $R^1$ group is independently selected from hydrogen or a saturated hydrocarbyl group having from 1 to about 10, preferably from 1 to about 4 carbon atoms, and x has a value from zero to 4.

The term hydrocarbyl as employed herein refers to groups such as, for example, alkyl, cycloalkyl, aryl, alkaryl, and aralkyl.

Suitable aromatic materials containing, per molecule, one polymerizable ethylenically unsaturated group and one group containing an ether linked epoxide group include, for example, p-isopropenylphenyl glycidyl ether, m-isopropenylphenyl glycidyl ether, o-isopropenylphenyl glycidyl ether, m-vinylphenyl glycidyl ether, 3-vinyl-5-methylphenyl glycidyl ether, p-isopropenylphenyl methylglycidyl ether, mixtures thereof and the like.

Suitable materials containing at least one oxyalkylene group and is terminated in a group having at least one hydrogen atom which is reactive with an ether linked epoxide group include adducts of alkylene oxides, aryl substituted alkylene oxides or halogen substituted alkylene oxides with aliphatic, cycloaliphatic, or aromatic initiator compounds having at least one hydrogen atom reactive with alkylene oxides, epoxy-containing materials such as epihalohydrins, styrene oxide and the like.

Suitable such initiator compounds include aliphatic alcohols and thiols, aliphatic diols and dithiols, mono- and polyhydric aromatic compounds such as phenols, bisphenols, novolac resins and the like.

Particularly suitable as initiator compounds are those having from 2 to about 8 hydrogen atoms reactive with alkylene oxides or substituted alkylene oxides which initiator compounds include, for example, water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like. Particularly suitable alkylene oxides include, ethylene oxide, 1,2-propylene oxide, 1,2-butylene oxide, 2,3-butylene oxide, mixtures thereof and the like.

Also suitable as initiators are ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4"-triamine, 4,4-di(methylamino)diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3', 5'-tetraethyl-4,4'-diaminodiphenylmethane and amine aldehyde condensation products such as the polyphenyl-polymethylene polyamines produced from aniline and formaldehyde, mixtures thereof and the like.

Polyester polyols are also suitable as the material containing at least one oxyalkylene group and at least one group containing a hydrogen atom reactive with an ether linked epoxide group.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexanetriol; 1,2,4-butanetriol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

The unsaturated polyester resins suitable for use herein are well known and are described in Kirk-Othmer Encyclopedia of Chemical Technology, 3rd edition, pp. 575–594 which is incorporated herein by reference.

The unsaturated polyesteramide resins suitable for use herein are prepared by substitution of a portion of the polyol with a suitable polyamine or mixture of polyamines.

The norbornyl (dicyclopentadiene) modified unsaturated polyesters which can be used herein can be prepared by the methods described in U.S. Pat. Nos. 4,189,548 or 4,167,542 and 4,148,765.

The norbornyl (dicyclopentadiene) modified unsaturated polyesteramides which can be used herein can be prepared by the methods described herein.

The polyols used in either unsaturated polyesters or polyesteramides are from the class of those having the formula: HO—$R_2$—OH where $R_2$ is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can also be used.

The polyamines used to make polyesteramides are from the class of those having the formula:

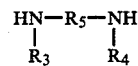

wherein $R_3$ and $R_4$ are independently selected from the group consisting of hydrogen, aliphatic, cycloaliphatic and aromatic radicals, or $R_3$ and $R_4$ taken together with the remainder of the molecule form an aliphatic ring; and $R_5$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene. Mixtures of two or more of such polyamines can also be used.

Typical diamines that are useful are ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis-(aminomethyl)dicyclopentadiene and homopiperazine. Typical polyamines are aminoethylpiperazine and diethylenetriamine.

Representatives of the useful diols are: ethylene glycol, propylene glycol, diethylene glycol, dipropylene glycol, dicyclopentadiene dimethanol, bis(hydroxymethyl)norbornane, methyl cyclohexanedimethanol, bis(-hydroxypropyl)bisphenol A and other hydroxyalkylated bisphenols. Typical polyols are pentaerythritol and glycerine propoxylates.

The α, β-unsaturated polycarboxylic acid is preferably maleic acid, fumaric acid, the anhydride of maleic acid or mixtures of these compounds. Such acids are readily available, have good reactivity with the diol and/or the diamine, and result in products of good properties. Other less preferred polycarboxylic acids include itaconic acid, citraconic acid, and the like.

Part of the α, β-unsaturated polycarboxylic acid may be replaced with a saturated or aromatic polycarboxylic acid to vary the crosslinking potential and physical properties of the modified unsaturated polyester or polyesteramide. Such acids include the aliphatic acids such as adipic acid and the aromatic acids such as isophthalic acid. Replacement of part of the α, β-unsaturated acid with such acids is commonplace in the polyester art. Suitable selection of the acid and the amount necessary to achieve a desired purpose will be known to the skilled worker and can be optimized with simple preliminary experiments.

The total amount of acid varies as a function of the total polyol or mixture of polyol and polyamine and norbornyl ingredients used.

The terminal group used to modify the polyester or polyesteramide is a norbornyl radical. Dicyclopentadiene (DCPD) is a most preferred norbornyl functional material to be employed in terminating one or both ends of the chain. Polycyclopentadiene (i.e., DCPD oligomers) or dicylopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene and the like.

Either the $C_{10}$ concentrate or the relatively pure DCPD may be employed in preparing the modified polyesters or polyesteramides.

The modified unsaturated polyesters or polyesteramides can be prepared by a variety of techniques. In a preferred method, molten $\alpha,\beta$-unsaturated carboxylic anhydride is partially hydrolyzed with less than the stoichiometric equivalent of water and reacted with the norbornyl derivative to form an ester of that derivative and containing unesterified acid and anhydride. This reaction may conveniently be performed in stages whereby a reactant is added stepwise to control reaction exotherms. The product mixture is then reacted with the polyol and polyamine or the polyol alone to result in the desired modified unsaturated polyesters or polyesteramides.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and polyamine or the polyol alone. After addition of the polyol and polyamine or the polyol alone is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten $\alpha,\beta$-unsaturated carboxylic anhydride is essentially totally hydrolyzed with a stoichiometric or greater equivalent of water and reacted with the norbornyl derivative to form an ester of that derivative and containing unesterified acid. This reaction may conveniently be performed in stages whereby a reactant is added stepwise, controlling reaction exotherms. The product mixture is then reacted with the polyol and polyamine or the polyol alone to result in the desired modified unsaturated polyester or polyesteramide.

In a typical procedure, molten maleic anhydride and the stoichiometric or greater equivalent of water are maintained at an elevated temperature from about 50° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and polyamine or the polyol alone are added to the mixture of esterified DCPD and acid as previously described.

Many other alternate methods will be recognized by the skilled worker. For example, molten maleic anhydride may be added to a mixture of DCPD and water in a reactor. The polyol and polyamine or the polyol alone are added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

The vinyl ester resins (VER) useful herein are a well known class of resins made from unsaturated carboxylic acids and polyepoxides. Vinyl ester resins are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,122 and 3,179,623 describes the preparation of VER from monocarboxylic acids such as acrylic and methacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,301,743 to Fekete, et al. Fekete, et al. describe VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan, and the like, may be utilized in place of the dicarboxylic acid. All of the above-described resins, which contain the characteristic linkage

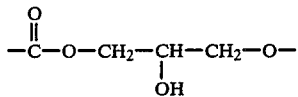

and terminal polymerizable vinylidene groups are classified as VER and are incorporated by reference.

Briefly, any of the known polyepoxides may be employed in the preparation of the vinyl ester resins. Useful polyepoxides are glycidyl polyethers of both polyhydric alcohols and polyhydric phenols, such as the diglycidyl ether of bisphenol A, epoxy novolacs, epoxidized fatty acids or drying oil acids, epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or phenols having weights per epoxide group of about 150 to 2000. The polyepoxides may be nuclearly substituted with halogen, preferably bromine. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

Vinyl ester resins are commercially available from The Dow Chemical Company under the trademark DERAKANE.

Any polymerizable ethylenically unsaturated monomer can be used herein. Such non-resinous ethylenically unsaturated monomers include both monovinyl and polyvinyl monomers. Typical monomers include the alkenyl aromatic monomers such as styrene, α-methylstyrene, chlorostyrene, divinylbenzene, vinyltoluene, t-butylstyrene, and the like; and alkyl and hydroxyalkyl esters of acrylic and methacrylic acid such as the methyl, ethyl, propyl, butyl, cyclohexyl, and hydroxyethyl esters. In addition to the above, other monomers that are especially useful for ultra-violet light curable systems such as 2-acetoxyalkyl acrylates, pentaerythritol di-, tri-, or tetra-acrylate may be used.

Suitable curing agents or catalysts which can be employed to cure the compositions of the present invention include, for example, free radical forming catalysts. Examples of these catalysts are benzoyl peroxide, tertiary butyl peroxide, methylethyl ketone peroxide, and the like. It is frequently of value to add accelerators such as cobalt naphthenate, dimethylaniline, and the like.

The compositions of the present invention are useful in the preparation of films, unfilled castings, highly filled castings, laminates, coatings, molded products and the like. The compositions taught by this invention are especially suited for use in applications requiring improved flexibility in conjunction with enhanced impact strength. Typical of these applications are bulk and sheet molding compounds and the parts prepared from said compounds.

The following examples are illustrative of the present invention but are not to be construed as to limiting the scope thereof in any manner.

EXAMPLE 1

A. Preparation of Reactive Monomer p-Isopropenylphenyl glycidyl ether (0.20 mole, 38.04 grams), polypropylene glycol (0.10 mole, 200.0 grams) with an average molecular weight of 2000 and potassium hydroxide (0.002 mole, 0.12 grams) were added to a glass reactor and maintained under a nitrogen atmosphere with stirring. The reactants were heated to 90° C. and maintained for two hours (7200 s) after which time, infrared spectrophotometric analysis of a film sample of the transparent reaction product demonstrated that the reaction of the epoxide with the aliphatic glycol ether hydroxyl groups was essentially complete. Hydroquinone (100 ppm) was added, then the reactor was cooled followed by filtration of the reaction product thus providing a reactive monomer of the following formula:

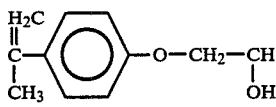 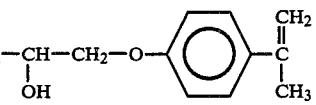

where x = about 34.

B. Preparation of Vinyl Ester Resin

About 1 equivalent of methacrylic acid was reacted with 0.75 equivalent of an epoxy novolac having an epoxide equivalent weight (EEW) of 175–182 and 0.25 equivalent of a glycidyl polyether of bisphenol A having an EEW of 186–192. The above reactants were heated to 115° C. with catalyst (catalyst type known to previously cited art) and hydroquinone present until the carboxylic acid content reached about 1 percent. The reactants were cooled and then styrene (containing 50 ppm of t-butyl catechol) was added. The final vinyl ester resin diluted with styrene had a pH of 7.7 and contained approximately:

| Contents | % |
| --- | --- |
| styrene | 36.0 |
| methacrylic acid* | 20.6 |
| epoxy novolac* (EEW = 175–182) | 32.1 |
| diglycidyl ether of bisphenol A* (EEW = 186–192) | 11.3 |
| | 100.0 |

*Prereacted to form a vinyl ester resin

C. Preparation and Curing of Curable Composition

Portions of the above styrenated vinyl ester resin prepared in B above and the reactive monomer prepared in A above were blended to form the following series of curable mixtures:

| | Vinyl Ester Resin (grams/percent) | Reactive Monomer (grams/percent) |
| --- | --- | --- |
| Formulation 1 | 350.0/97.08 | 10.53/2.92 |

|  | Vinyl Ester Resin (grams/percent) | Reactive Monomer (grams/percent) |
| --- | --- | --- |
| Formulation 2 | 375.0/95.98 | 15.7/4.02 |
| Formulation 3 | 375.0/92.48 | 30.5/7.52 |

These solutions were used to determine Brookfield viscosity (25° C.), SPI gel characteristics (84° C.), average Barcol hardness (934-1 scale), and a clear, unfilled ⅛ inch (0.3175 cm) casting was made for heat distortion temperature (264 psi, 1820 kPa), tensile and flexural strength, flexural modulus, and percent elongation determinations. The clear casting was prepared using a cure system of 1.0% benzoyl peroxide and 0.05% N,N-dimethylaniline at room temperature (25° C.), followed by post curing for 2.0 hours (7200 s) at 100° C. (212° F.). Mechanical properties of tensile (6) and flexural (6) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648). The results are reported in Table I.

COMPARATIVE EXPERIMENT A

A portion of the styrenated vinyl ester resin of Example 1B was used to determine physical and mechanical properties using the method of Example 1. The results are reported in Table I.

COMPARATIVE EXPERIMENT B

A. Preparation of Reactive Monomer

A reactive monomer was prepared wherein toluene diisocyanate and polypropylene glycol with an average molecular weight of 2000 were first reacted, followed by reaction with p-isopropenyl phenol. The reaction was specifically performed as followed:

Polypropylene glycol (0.06375 mole, 127.50 grams) with an average molecular weight of 2000 and containing dissolved stannous octoate catalyst (0.104 gram) was added over a thirty minute (1800 s) period to a glass reactor containing toluene diisocyanate (0.1275 mole, 22.21 grams) maintained under a nitrogen atmosphere with stirring. The toluene diisocyanate was an 80 to 20 weight percent mixture of the 2,4- and 2,6-isomers, respectively. The p-isopropenyl phenol contained less than 1.6 weight percent dimer and only a trace of residual phenol. After the addition of the polypropylene glycol and stannous octoate solution was complete, the reaotion temperature was increased to 60° C. After three hours (10,800 s) at the 60° C. reaction temperature, infrared spectrophotometric analysis of a film sample of the transparent reaction product demonstrated that the reaction of the isocyanate with the aliphatic hydroxyl group was complete (disappearance of hydroxyl group, appearance of carbonyl group). p-Isopropenyl phenol (0.1275 mole, 17.11 grams) was added to the reactor followed by the addition of an additional catalyst, a tertiary amine commercially available from Abbot Labs as Polycat DBU (0.076 gram). The reaction temperature was increased to 90° C. and this reaction temperature was maintained for two hours (7200 s). At this time, infrared spectrophotometric analysis of a film sample of the transparent, gelatinous reaction product demonstrated that the reaction of the remaining isocyanate groups with the phenolic hydroxyl group was complete. Hydroquinone (100 ppm) was added to the reactor and the reactive monomer was recovered.

B. Preparation and Curing of Curable Composition

A portion of the reactive monomer (15.7 grams) prepared in A above and a portion of the styrenated vinyl ester resin (375.0 grams) from Example 1B were formulated to provide a 4.02, 95.98% solution, respectively. The physical and mechanical properties were determined using the method of Example 1. The results are reported in Table I.

TABLE I

|  | Example 1 Formulation 1 | Example 1 Formulation 2 | Example 1 Formulation 3 | Comparative Experiment A | Comparative Experiment B |
| --- | --- | --- | --- | --- | --- |
| Brookfield Viscosity, cp | 266 | 251 | 264 | 260 | 240 |
| SPI Gel Test |  |  |  |  |  |
| gel time, min./sec. | 9.1/546 | 9.6/576 | 10.2/612 | 8.0/480 | 13.5/810 |
| cure time, min./sec. | 11.0/660 | 11.4/684 | 12.3/738 | 9.5/570 | 18.0/1080 |
| maximum exotherm (°C.) | 210 | 199 | 194 | 209 | 174 |
| Average Barcol Hardness | 45 | 41 | 28 | 39 | 35 |
| Heat Distortion Temperature, °F./°C. | 228/109 | 222/106 | 184/84 | 214/101 | 198/92 |
| Tensile Strength, |  |  |  |  |  |
| psi | 11835 | 11034 | 8401 | 9040 | 9160 |
| kPa | 81600 | 76077 | 57923 | 62329 | 63156 |
| Elongation (%) | 3.72 | 4.16 | 4.64 | 2.83 | 3.90 |
| Flexural Strength, |  |  |  |  |  |
| psi | 21772 | 20949 | 14314 | 19220 | 14650 |
| kPa | 150114 | 144439 | 98692 | 132518 | 101009 |
| Flexural Modulus, |  |  |  |  |  |
| psi | 589000 | 565000 | 424000 | 641000 | 485000 |
| kPa | 4061037 | 3895562 | 2923395 | 4419567 | 3343978 |

EXAMPLE 2

A. Preparation of Dicyclopentadiene Modified Unsaturated Polyesteramide Resin Maleic anhydride (7.0 moles, 686.42 grams) was added to a reactor and heated to a clear, stirred solution maintained at 100° C. under a nitrogen atmosphere. Water (7.1 moles, 127.94 grams) was added to the reactor. A maximum exotherm of 132° C. resulted two minutes (120 s) later, followed by a decrease in the reaction temperature to 121° C. fifteen minutes (900 s) after the initial water addition. At this time, dicyclopentadiene (2.10 moles, 277.64 grams) of 97 percent purity was added. A maximum exotherm of 126° C. resulted one minute (60 s) later with a 120° C. temperature being re-established three minutes (180 s) after the initial dicyclopentadiene addition. Fifteen minutes (900 s) after the initial addition of dicyclopentadiene, a second portion of dicyclopentadiene (2.10 moles, 277.64 grams) was added. Fifteen minutes (900 s) later, a final aliquot of dicyclopentadiene (2.10 moles, 277.64 grams) was added and the temperature controller was maintained at 120° C. This temperature was re-established three minutes (180 s) later. After 30 minutes (1800 s), propylene glycol (3.78 moles, 287.66 grams) and piperazine (0.420 mole, 36.18 grams) were added to the reactor and the steam condenser was started, nitrogen sparging was increased to 0.5 liter per minute (0.0083 s), and the temperature controller was set at 160° C. The 160° C. temperature was reached twenty minutes (1200 s) later. After two hours (7200 s) at 160° C., the temperature controller was set at 205° C., and this temperature was achieved twenty-six minutes (1560 s) later. After 14.0 hours (50,400 s), a total of 141 milliliters of water layer and 27 milliliters of organic material were collected in the Dean Stark trap. The reactor was cooled to 165° C. and 100 ppm of hydroquinone was added.

The dicyclopentadiene modified unsaturated polyesteramide resin was recovered as a transparent, light yellow-colored solid with a final acid number of 18.8.

B. Preparation and Curing of Curable Compositions

A portion of the dicyclopentadiene modified unsaturated polyesteramide (228.0 grams) prepared in A above, a reactive monomer (30.0 grams) and styrene (142.0 grams) were formulated to provide a 57.0, 7.5, 35.5% solution, respectively. The reactive monomer used in this formulation was the same as that described in Example 1A. The physical and mechanical properties of the resin formulation were determined using the method of Example 1. The results are reported in Table II.

COMPARATIVE EXPERIMENT C

A portion of the dicyclopentadiene modified unsaturated polyesteramide (199.5 grams) of Example 2A and styrene (150.5 grams) were blended to provide a 57.0, 43.0 percent solution, respectively. The physical and mechanical properties of the resin formulation were determined using the method of Example 1. The results are reported in Table II.

TABLE II

| | Example 2 | Comparative Experiment C |
|---|---|---|
| Brookfield Viscosity (cp) | 412 | 184 |
| SPI Gel Test | | |
| gel time, min./sec. | 4.1/246 | 2.7/162 |
| cure time, min./sec. | 7.4/444 | 4.9/294 |
| maximum exotherm (°C.) | 185 | 221 |
| Average Barcol Hardness | 28 | 41 |
| Heat Distortion Temperature, °F./°C. | 199/93 | 239/115 |
| Tensile Strength, | | |
| psi | 4200 | 4800 |
| kPa | 28958 | 33095 |
| Elongation (%) | 1.40 | 1.10 |
| Flexural Strength, | | |
| psi | 10260 | 13400 |
| kPa | 70741 | 92390 |
| Flexural Modulus, | | |
| psi | 382000 | 585000 |
| kPa | 2633814 | 4033458 |

EXAMPLE 3

A portion of the styrenated vinyl ester resin of Example 1B and the reactive monomer of Example 1A were formulated to provide a resin solution containing 7.5 percent by weight of the reactive monomer. The resin solution was blended with number three blasting sand so as to provide polymer modified concrete containing 20.0 percent by weight resin solution. The polymer modified concrete formulation was used to prepare a pair of tensile strength test castings of the following dimensions: 1.0 inch thick, 3.0 inches length, 1.625 inches at tab ends, 1.0 inch at center. A cure system of 1.0 percent methylethylketone peroxide, 0.4 percent dimethylaniline, and 0.6 percent cobalt naphthenate (6.0 percent) was used at room temperature (25° C.) followed by post curing at room temperature for three days. The test castings were used for tensile strength testing using an Instron machine. The results are reported in Table III.

COMPARATIVE EXPERIMENT D

A portion of the styrenated vinyl ester resin of Example 1B was used to prepare a pair of polymer modified concrete tensile strength castings using the method of Example 3. The test pieces were used for tensile strength testing using the method of Example 3. The results are reported in Table III.

TABLE III

| | Reactive Monomer Used in Resin Formulation (wt. %) | Tensile Strength psi/kPa |
|---|---|---|
| Example 3 | 7.5 | 1795/12376 |
| Comparative Experiment D | none | 1587/10942 |

EXAMPLE 4

Portions (50.0 grams) of the styrenated vinyl ester resin and reactive monomer formulations from Example 1C and designated as Formulation 2 and Formulation 3 were used to prepare 0.0625 inch (0.15875 cm) clear, unfilled castings and cured using the method of Example 1. A test piece was prepared from each of the clear, unfilled castings to have the following measurements: 6.5 inches (16.51 cm) length, 0.625 inch (1.5875 cm) width at tab ends, routed to a 0.400 inch (1.016 cm) width at center. Each test piece was used for plane strain compression testing with applied tension using the methods of P. B. Bowden and J. A. Jukes reported in Journal of Material Science 3, 183 (1968) and 7, 52 (1972). Sample cross-sectional area was 0.025 square inch (0.16129 cm$^2$) and tensile load was increased by 564 psi (3889 kPa) increments. The creep rate taken as yield as approximately 0.002 inch per minute (0.3048 cm/sec). Tension (psi) versus compression (psi) yield point values thus obtained were plotted. Tensile and compressive yield strength values were determined by extrapolation of the plotted biaxial yield line. Ductility was calculated as the ratio of compression at break to the compressive yield strength then that value was subtracted from one. Alternatively, ductility may be calculated as the ratio of the tension at break to the tensile yield strength. The results are reported in Table IV.

COMPARATIVE EXPERIMENT E

A portion (50.0 grams) of the styrenated vinyl ester resin from Comparative Experiment A was used in plane strain compression testing with applied tension using the method of Example 4. The results are reported in Table IV.

TABLE IV

|  | Example 4 Formulation 2 | Example 4 Formulation 3 | Comparative Experiment E |
|---|---|---|---|
| Ductility | 0.65 | 0.60 | 0.147 |
| Tension at break, |  |  |  |
| psi | 7745 | 5630 | 3075 |
| kPa | 5340 | 38818 | 21202 |
| Compression at Break, |  |  |  |
| psi | 6435 | 5655 | 17550 |
| kPa | 44368 | 38990 | 121004 |
| Tensile Yield Strength, |  |  |  |
| psi | 11900 | 9400 | (*) |
| kPa | 82048 | 64811 |  |
| Compressive Yield Strength, |  |  |  |
| psi | 18252 | 13845 | 20572 |
| kPa | 125844 | 95459 | 141840 |

(*) Cannot be extrapolated accurately with data points collected.

EXAMPLE 5

A portion (50.0 grams) of the dicyclopentadiene modified unsaturated polyesteramide, reactive monomer, and styrene formulation from Example 2B was used in plane strain compression testing with applied tension using the method of Example 4. The results are reported in Table V.

COMPARATIVE EXPERIMENT F

A portion (50.0 grams) of the dicyclopentadiene modified unsaturated polyesteramide and styrene formulation from Comparative Experiment C was used in plane strain compression testing with applied tension using the method of Example 4. The results are reported in Table V.

TABLE V

|  | Example 5 | Comparative Experiment F |
|---|---|---|
| Ductility | 0.40 | 0.06 |
| Tension at Break, |  |  |
| psi | 2826 | 919 |
| kPa | 19485 | 6336 |
| Compression at Break, |  |  |
| psi | 6302 | 18515 |
| kPa | 43451 | 127657 |
| Tensile Yield Strength, |  |  |
| psi | 7100 | (*) |
| kPa | 48953 |  |
| Compressive Yield Strength |  |  |
| psi | 10387 | 19697 |
| kPa | 71616 | 135807 |

(*) Cannot be extrapolated accurately with data points collected.

EXAMPLE 6

A. Preparation of Reactive Monomer p-Isopropenylphenyl glycidyl ether (0.15 mole, 28.54 grams), a polypropylene(ethylene) glycol adduct of glycerin (0.05 mole, 146.09 grams) and potassium hydroxide (0.0015 mole, 0.09 gram) were added to a glass reactor and maintained under a nitrogen atmosphere with stirring. The polypropylene(ethylene) glycol adduct of glycerin was prepared by reaction of a 92.0 percent propylene oxide, 8.0 percent ethylene oxide mixture with glycerin to a 3000 average molecular weight. The reactants were heated to 80° C. and maintained for one hour (3600 s) after which time, infrared spectrophotometric analysis of a film sample of the transparent reaction product demonstrated that the reaction of the epoxide with the aliphatic glycol ether hydroxyl groups was essentially complete. Hydroquinone (100 ppm) was added, then the reactor was cooled followed by filtration of the reaction product thus providing a reactive monomer of the following statistical formula:

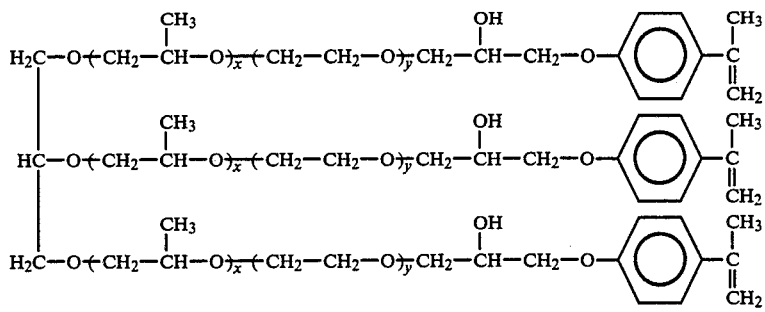

where total of all x = about 46.1
where total of all y = about 5.3

B. Preparation and Curing of Curable Composition

A portion of the reactive monomer (15.7 grams) prepared in A above and a portion of the styrenated vinyl ester resin (375.0 grams) of Example 1B were formulated to provide a 4.02, 95.98 percent solution, respectively. The physical and mechanical properties were determined using the method of Example 1. The results are reported in Table 6 and may be compared with the results obtained for Comparative Experiment A reported in Table I.

TABLE VI

|  | Example 6 |
|---|---|
| Brookfield Viscosity (cp) | 230 |
| SPI Gel Test |  |
| gel time, min./sec. | 14.3/858 |
| cure time, min./sec. | 16.4/984 |
| maximum exotherm (°C.) | 203 |
| Average Barcol Hardness | 37 |
| Heat Distortion Temperature, °F./°C. | 201/94 |
| Tensile Strength, psi/kPa | 10734/74009 |
| Elongation (%) | 5.02 |
| Flexural Strength, psi/kPa | 20275/139792 |

TABLE VI-continued

| | Example 6 |
|---|---|
| Flexural Modulus, psi/kPa | 531000/3661139 |

EXAMPLE 7

A. Preparation and Curing of Curable Compositions

A portion of the reactive monomer (30.4 grams) prepared in Example 6A and a portion of a commercial grade styrenated isophthalic unsaturated polyester (375.0 grams) were formulated to provide a 7.5, 92.5 percent solution, respectively. The isophthalic unsaturated polyester was prepared by condensation reaction of maleic anhydride, isophthalic acid, and propylene glycol followed by addition of styrene. The physical and mechanical properties were determined using the method of Example 1. The results are reported in Table VII.

COMPARATIVE EXPERIMENT G

A portion of the styrenated commercial grade isophthalic unsaturated polyester resin of Example 7A was used to determine physical and mechanical properties using the method of Example 1. The results are reported in Table VII.

TABLE VII

| | Example 7 | Comparative Experiment G |
|---|---|---|
| Brookfield Viscosity (cp) | 434 | 224 |
| SPI Gel Test | | |
| gel time, min./sec. | 8.6/516 | 4.1/35.3 |
| cure time, min./sec. | 12.6/108.4 | 6.1/52.5 |
| maximum exotherm (°C.) | 175 | 215 |
| Average Barcol Hardness | 11 | 47 |
| Heat Distortion Temperature, °F./°C. | 129/54 | 208/98 |
| Tensile Strength, | | |
| psi | 4567 | 9671 |
| kPa | 31489 | 66680 |
| Elongation (%) | 8.19 | 2.07 |
| Flexural Strength, | | |
| psi | 9197 | 21660 |
| kPa | 63411 | 149341 |
| Flexural Modulus, | | |
| psi | 296000 | 621000 |
| kPa | 2040861 | 4281671 |

EXAMPLE 8

A. Preparation and Curing of Curable Compositions

A portion of the reactive monomer (30.0 grams) prepared in Example 6A, a portion of the dicyclopentadiene modified unsaturated polyesteramide (228.0 grams) of Example 2A, and styrene (142.0 grams) were formulated to provide a 7.5, 57.0, 43.0 percent solution, respectively. The physical and mechanical properties were determined using the method of Example 1. The results are reported in Table VIII and may be compared with the results obtained for Comparative Experiment C reported in Table II.

TABLE VIII

| | Example 8 |
|---|---|
| Brookfield Viscosity (cp) | 347 |
| SPI Gel Test | |
| gel time, min./sec. | 6.2/372 |
| cure time, min./sec. | 9.6/576 |
| maximum exotherm (°C.) | 193 |

TABLE VIII-continued

| | Example 8 |
|---|---|
| Average Barcol Hardness | 27 |
| Heat Distortion Temperature, °F./°C. | 192/89 |
| Tensile Strength, | |
| psi | 7275 |
| kPa | 50160 |
| Elongation (%) | 4.11 |
| Flexural Strength, | |
| psi | 12353 |
| kPa | 85171 |
| Flexural Modulus, | |
| psi | 394000 |
| kPa | 2716551 |

EXAMPLE 9

Ten 2.5 by 0.5 by 0.125 inch (6.35 by 1.27 by 0.3175 cm) test pieces were prepared from the clear, unfilled castings of Example 1-Formulation 2, Example 1-Formulation 3, Example 2, Example 6, Example 7, Example 8, Comparative Experiment A, Comparative Experiment B, Comparative Experiment C, and Comparative Experiment G. Each series of test pieces were tested for unnotched Izod impact using a TMI Impact Tester No. 43-1 with standard test methods (ASTM D-256). The results are reported in Table IX.

TABLE IX

| | Unnotched Izod Impact ft.-lbs./in. (J/cm) |
|---|---|
| Example 1-Formulation 2 | 4.3 (0.36) |
| Example 1-Formulation 3 | 5.2 (0.43) |
| Example 2 | 1.3 (0.11) |
| Example 6 | 3.9 (0.32) |
| Example 7 | 4.3 (0.36) |
| Example 8 | 2.9 (0.24) |
| Comparative Experiment A | 1.9 (0.16) |
| Comparative Experiment B | 4.2 (0.35) |
| Comparative Experiment C | 1.0 (0.08) |
| Comparative Experiment G | 2.9 (0.24) |

EXAMPLE 10

A portion (50.0 grams) of the styrenated vinyl ester and reactive monomer formulation from Example 6B was used in plane strain compression testing with applied tension using the method of Example 4. The results are reported in Table X and may be compared with the results obtained for Comparative Experiment E reported in Table IV.

TABLE X

| | Example 10 |
|---|---|
| Ductility | 0.71 |
| Tension at Break, | |
| psi | 8386 |
| kPa | 57820 |
| Compression at Break, | |
| psi | 5045 |
| kPa | 34784 |
| Tensile Yield Strength, | |
| psi | 11800 |
| kPa | 81359 |
| Compressive Yield Strength, | |
| psi | 16803 |
| kPa | 115853 |

EXAMPLE 11

A portion (50.0 grams) of the commercial grade styrenated isophthalic unsaturated polyester and reactive monomer formulation from Example 7A was used in plane strain compression testing with applied tension using the method of Example 4. The results are reported in Table XI.

COMPARATIVE EXPERIMENT H

A portion (50.0 grams) of the commercial grade styrenated isophthalic unsaturated polyester resin from Comparative Experiment G was used in plane strain compression testing with applied tension using the method of Example 4. The results are reported in Table XI.

TABLE XI

|  | Example 11 | Comparative Experiment H |
|---|---|---|
| Ductility | 0.83 | 0.49 |
| Tension at Break, | | |
| psi | 4752 | 7030 |
| kPa | 32764 | 48470 |
| Compression at Break, | | |
| psi | 1257 | 10523 |
| kPa | 8667 | 72554 |
| Tensile Yield Strength, | | |
| psi | 5750 | 14500 |
| kPa | 39645 | 99975 |
| Compressive Yield Strength, | | |
| psi | 7387 | 20500 |
| kPa | 50932 | 141343 |

EXAMPLE 12

A portion (50.0 grams) of the dicyclopentadiene modified unsaturated polyesteramide, reactive monomer, and styrene formulation from 8A was used in plane strain compression testing with applied tension using the method of Example 4. The results are reported in Table XII and may be compared with the results obtained for Comparative Experiment E reported in Table V.

TABLE XII

|  | Example 12 |
|---|---|
| Ductility | 0.78 |
| Tension at Break, | |
| psi | 4960 |
| kPa | 34198 |
| Compression at Break, | |
| psi | 2033 |
| kPa | 14017 |
| Tensile Yield Strength, | |
| psi | 6400 |
| kPa | 44127 |
| Compressive Yield Strength, | |
| psi | 9032 |
| kPa | 62274 |

I claim:

1. A composition which when admixed with a suitable quantity of a free radical forming catalyst stem therefor thermosets to a cured condition, which composition comprises
   (A) an unsaturated polyester resin, an unsaturated polyesteramide resin, norbornyl modified unsaturated polyester resin, norbornyl modified unsaturated polyesteramide resin, vinyl ester resin or mixture of any of such resins in any combination;
   (B) at least one ethylenically unsaturated monomer resulting from reacting
      (1) an aromatic material containing, per molecule, only one polymerizable ethylenically unsaturated group and only one group containing an ether linked epoxide group; and
      (2) a material containing at least one oxyalkylene group and is terminated in a group having at least one hydrogen atom which is reactive with an ether linked epoxide group and which hydrogen atom is not attached to an oxygen atom which is attached to an aromatic ring; and wherein the components are employed in quantities which provides an equivalent ratio of A:B of from about 0.1:1 to about 6:1; and
   (C) a polymerizable ethylenically unsaturated nonresinous monomer different from Component (B) and wherein
      (1) Component (A) is present in a quantity of from about 1 to about 99 percent by weight of the combined weight of Components (A), (B) and (C);
      (2) Component (B) is present in quantities of from about 1 to about 95 percent by weight of the combined weight of Components (A), (B) and (C); and
      (3) Component (C) is present in quantities of from zero to about 99 percent by weight of the combined weight of Components (A), (B) and (C).

2. A composition of claim 1 wherein
   (i) Component (A) is present in a quantity of from about 20 to about 80 percent by weight of the combined weight of Components (A), (B) and (C);
   (ii) Component (B) is present in quantities of from about 1 to about 25 percent by weight of the combined weight of Components (A), (B) and (C); and
   (iii) Component (C) is present in quantities of from 15 to about 75 percent by weight of the combined weight of Components (A), (B) and (C).

3. A composition of claim 2 wherein
   (i) Component (A) is present in a quantity of from about 40 to about 60 percent by weight of the combined weight of Components (A), (B) and (C);
   (ii) Component (B) is present in quantities of from about 1 to about 15 percent by weight of the combined weight of Components (A), (B) and (C); and
   (iii) Component (C) is present in quantities of from 25 to about 55 percent by weight of the combined weight of Components (A), (B) and (C).

4. Cured products resulting from curing the composition of claim 1.

5. Cured products resulting from curing the composition of claim 2.

6. Cured products resulting from curing the composition of claim 3.

* * * * *